US011882396B2

(12) United States Patent
Kulavik et al.

(10) Patent No.: US 11,882,396 B2
(45) Date of Patent: Jan. 23, 2024

(54) HEADSET WITH USER CONFIGURABLE NOISE CANCELLATION VS AMBIENT NOISE PICKUP

(71) Applicant: Voyetra Turtle Beach, Inc., White Plains, NY (US)

(72) Inventors: Richard Kulavik, San Jose, CA (US); Christopher Church, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 19 days.

(21) Appl. No.: 17/525,391

(22) Filed: Nov. 12, 2021

(65) Prior Publication Data

US 2022/0078543 A1 Mar. 10, 2022

Related U.S. Application Data

(63) Continuation of application No. 16/702,237, filed on Dec. 3, 2019, now Pat. No. 11,202,140, which is a (Continued)

(51) Int. Cl.
*H04R 1/10* (2006.01)
*H04S 7/00* (2006.01)
*G10K 11/178* (2006.01)

(52) U.S. Cl.
CPC ....... *H04R 1/1083* (2013.01); *G10K 11/1783* (2018.01); *G10K 11/17821* (2018.01);
(Continued)

(58) Field of Classification Search
CPC .............. H04R 2430/20; H04R 1/1083; H04R 2410/01; H04R 2430/21; H04R 25/40; G10L 25/78; G10L 2021/02166; G10L 21/0208; G10L 2025/783; G10L 15/20; G10K 11/17837; G10K 11/17821; G10K 11/17823; G10K 11/17857; G10K 11/17873; G10K 11/1783;
(Continued)

(56) References Cited

U.S. PATENT DOCUMENTS 5,940,118 A * 8/1999 Van Schyndel ........ H04R 3/005
348/14.05
8,542,817 B1 * 9/2013 Short .................. H04M 1/6016
379/390.01

(Continued)

*Primary Examiner* — Norman Yu
(74) *Attorney, Agent, or Firm* — McAndrews, Held & Malloy, Ltd.

(57) ABSTRACT

A system comprises automatic noise cancellation circuitry and interface circuitry operable to provide an interface via which a user can configure which sounds said automatic noise cancelling circuitry attempts to cancel and which sounds said automatic noise cancelling circuitry does not attempt to cancel. The interface circuitry may be operable to provide an interface via which a user can select a sound to whitelist or blacklist. The interface circuitry may be operable to provide an interface via which a user can increase or decrease an amount of noise cancellation that is desired. The interface circuitry may be operable to provide an interface via which a user can select from among three or more levels of noise cancellation.

17 Claims, 7 Drawing Sheets

Related U.S. Application Data continuation of application No. 14/930,828, filed on Nov. 3, 2015, now Pat. No. 10,497,353.

(60) Provisional application No. 62/075,322, filed on Nov. 5, 2014.

(52) U.S. Cl.
CPC .. *G10K 11/17823* (2018.01); *G10K 11/17837* (2018.01); *G10K 11/17857* (2018.01); *G10K 11/17873* (2018.01); *G10K 11/17885* (2018.01); *H04S 7/00* (2013.01); *G10K 2210/1081* (2013.01); *G10K 2210/3016* (2013.01); *H04S 2420/01* (2013.01)

(58) Field of Classification Search
CPC ..... G10K 11/17885; G10K 2210/1081; G10K 2210/3016; H04S 7/00; H04S 2420/01
USPC ............ 381/71.6, 71.11, 309, 71.8, 74, 94.1, 381/94.7, 107, 119, 13, 317, 56, 57, 61, 381/73.1, 94.3
See application file for complete search history.

(56) References Cited

U.S. PATENT DOCUMENTS

| | | | | |
|---|---|---|---|---|
| 10,497,353 | B2 | 12/2019 | Kulavik | |
| 2009/0047994 | A1* | 2/2009 | Sommer .............. | H04R 25/558 455/556.1 |
| 2010/0172510 | A1* | 7/2010 | Juvonen ........... | G10K 11/17873 381/71.1 |
| 2010/0290632 | A1* | 11/2010 | Lin ....................... | G01S 3/8006 381/313 |
| 2013/0293723 | A1* | 11/2013 | Benson .................. | H04R 5/033 381/74 |
| 2014/0079235 | A1 | 3/2014 | Lyons | |
| 2014/0105412 | A1* | 4/2014 | Alves ............... | G10K 11/17885 381/71.6 |
| 2014/0301557 | A1 | 10/2014 | Milligan | |
| 2015/0195641 | A1* | 7/2015 | Di Censo ............. | H04R 1/1083 381/71.6 |

* cited by examiner

FIG. 1C
150
(touch)screen
152
Hard controls
154

HEADSET WITH USER CONFIGURABLE NOISE CANCELLATION VS AMBIENT NOISE PICKUP

PRIORITY CLAIM

This application is a continuation of U.S. application Ser. No. 16/702,237, filed Dec. 3, 2019, which is a continuation of U.S. application Ser. No. 14/930,828 filed on Nov. 3, 2015, now U.S. Pat. No. 10,497,353, which claims priority to U.S. Provisional Patent Application 62/075,322, filed on Nov. 5, 2014. The aforementioned documents are hereby incorporated herein by reference in their entirety.

BACKGROUND

Limitations and disadvantages of conventional approaches to noise cancellation will become apparent to one of skill in the art, through comparison of such systems with some aspects of the present invention as set forth in the remainder of the present application with reference to the drawings.

BRIEF SUMMARY OF THE INVENTION

Systems and methods are provided for a headset with configurable noise cancellation substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
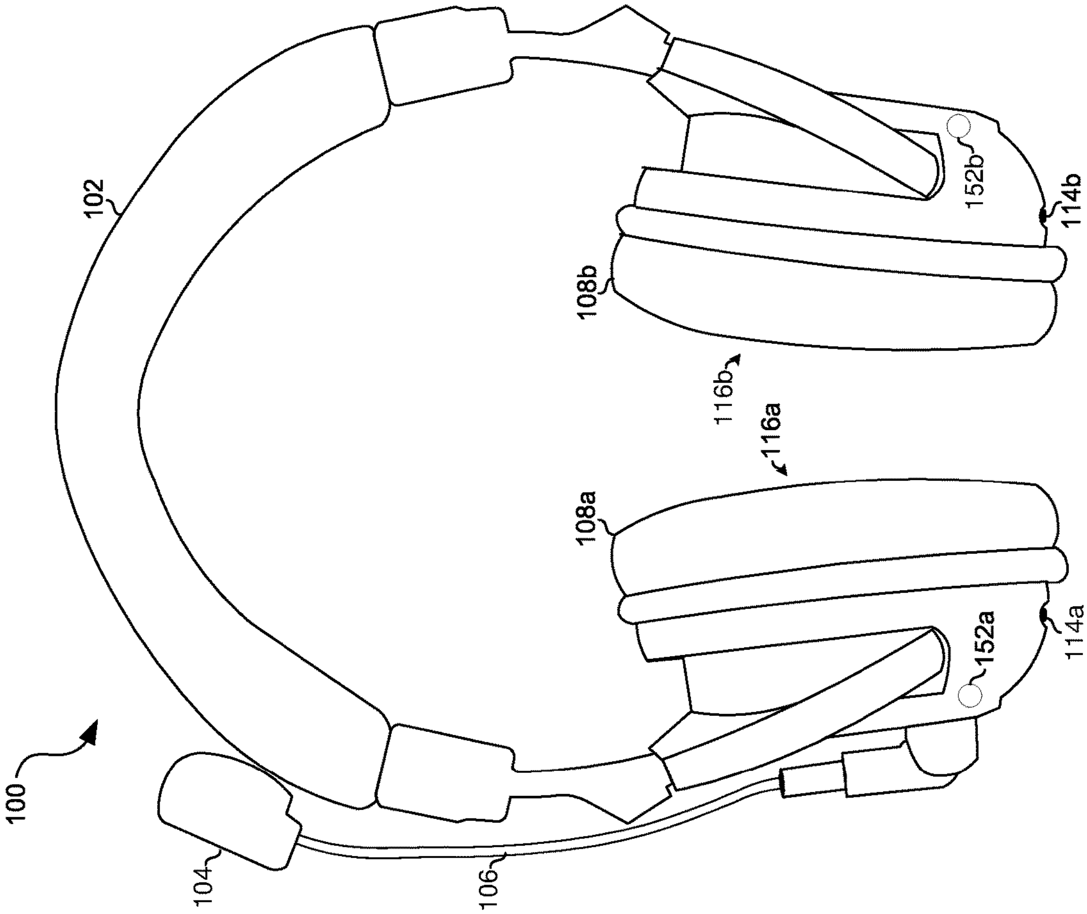
FIGS. 1A and 1B depict two views of an example embodiment of a networked gaming headset.
Figure 1B:
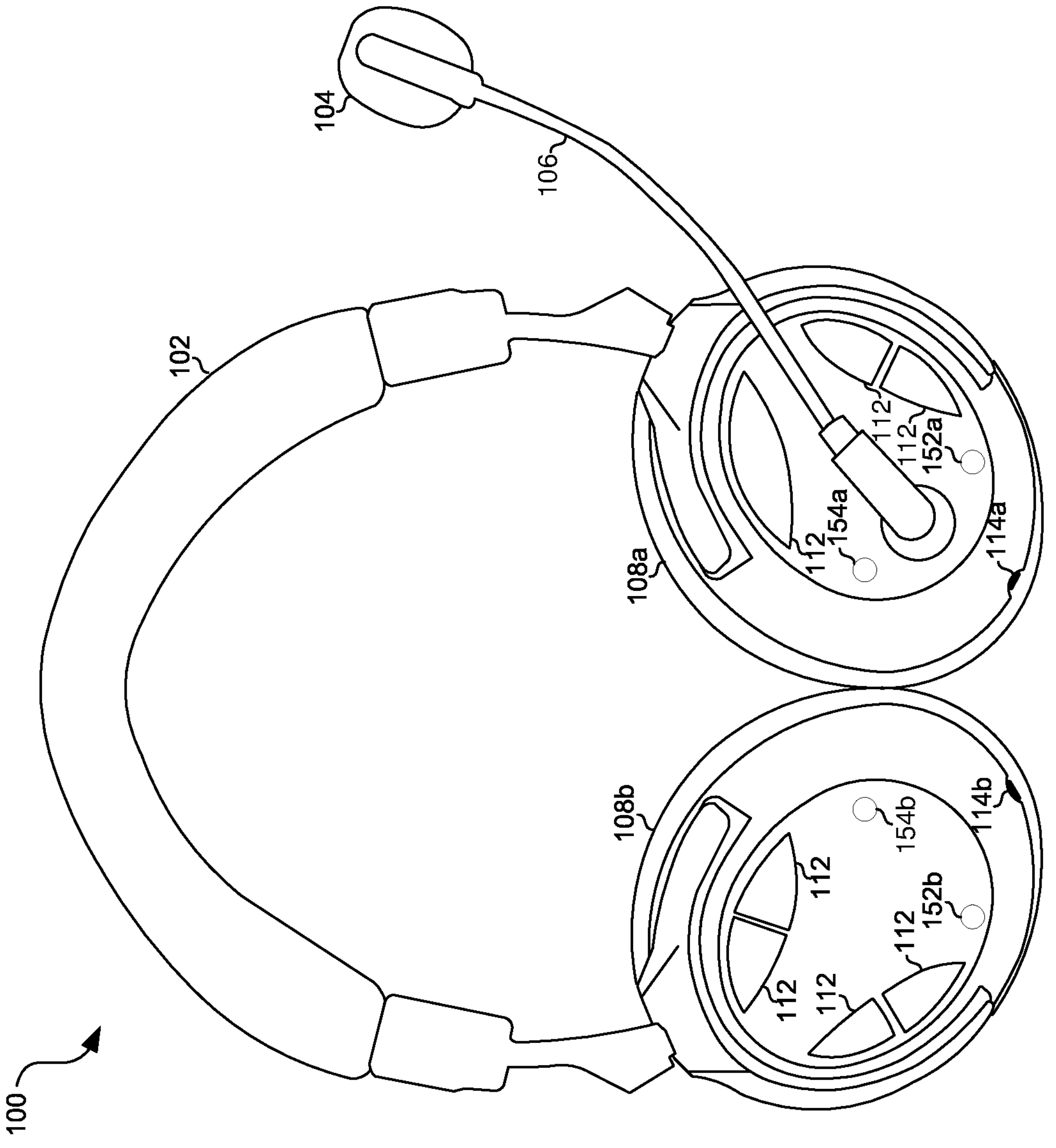

Referring to FIGS. 1A and 1B, there is shown two views of an example headset 100 that may present audio output by an audio source such as a home audio system, a television, a car stereo, a personal media player, a gaming console, desktop computer, laptop computer, tablet or smartphone. The headset 100 comprises a headband 102, a microphone boom 106 with user microphone 104, ear cups 108*a* and 108*b* which surround speakers 116*a* and 116*b*, connectors 114*a* and 114*b*, user controls 112, and automatic noise cancellation (ANC) microphones 152*a*, 152*b*, 154*a*, and 154*b*.

The user microphone 104 is operable to convert acoustic waves (e.g., the voice of the person wearing the headset) to electric signals for processing by circuitry of the headset 100 and/or for output to a device (e.g., console 176, basestation 300, a smartphone, and/or the like) that is in communication with the headset.

In an example implementation, the user microphone 104 may also operate as an ANC microphone when the user of the headset 100 is not speaking into the user microphone 104. In this regard, the headset 100 may be connected to a device (e.g., 150) with voice telephony and music capabilities. During a voice call, the headset 100, the device, or combination of the two may automatically detect that a call is in progress (e.g., in response to the user pressing an off-hook button on the headset or on the device itself) and/or that the wearer of the headset is talking (e.g., when level of captured vocal band audio in the direction of the user's mouth is above a threshold). In response to detecting that a call is in progress and/or that the wearer of the headset 100 is talking, the directionality, sensitivity, frequency response, and/or other characteristics of the microphone 104 and/or driver 240 (FIG. 2) may be controlled (e.g., mechanically through motors, servos, or the like and/or electrically through controlling gain and phase of multiple elements of a microphone array) for optimal capture of the wearer's voice. On the other hand, when the headset 100, device, or combination of the two detects that a call is not in progress (e.g., based on the user pressing an on-hook button on the device or on the headset 100, and/or based on the fact that audio having characteristics indicating that the headset is currently outputting music or some other content other than a voice call) the directionality, sensitivity, frequency response, and/or other characteristics of the microphone 104 and/or driver 240 (FIG. 2) for optimal capture of environmental noise (i.e., may be configured to treat the microphone 104 as being an ANC microphone). For example, when the wearer is listening to music the directionality of the microphone may be controlled to point behind the wearer of the headset 100 and/or may be configured to cancel repetitive sounds (e.g., engine noise in a plane) while still picking up noises such as cars or people approaching).

Each of the ANC microphones 152*a*, 152*b*, 154*a*, and 154*b* is operable to convert acoustic waves incident on it from external sources to electric signals to be processed by circuitry of the headset for performing ANC.

The speakers 116*a* and 116*b* are operable to convert electrical signals to acoustic waves.

The user controls 112 may comprise dedicated and/or programmable buttons, switches, sliders, wheels, etc., for performing various functions. Example functions which the controls 112 may be configured to perform include configuring ANC settings such as are described below with reference to FIG. 3.

The connectors 114*a* and 114*b* may be, for example, a USB port and/or charging port. The connectors 114*a* and 114*b* may be used for downloading data to the headset 100 from another computing device, uploading data from the headset 100 to another computing device, and/or charging batteries, if any, in the headset 100.

Figure 1C:
FIG. 1C depicts an example audio device which may output audio and/or control signals to a headset such as the headset of FIGS. 1A and 1B.

FIG. 1C depicts an example audio device which may output audio and/or control signals to a headset such as the headset of FIGS. 1A and 1B. The example device 150 may be, for example, a tablet computer, a smartphone, or a personal media player. The device 150 comprises a screen 152 (e.g., a touchscreen) and one or more hard controls (e.g., button, scroll wheel, switch, etc.). The device 150 is operable to output audio signals (e.g., in stereo or surround sound format) via a connector (e.g., 3.5 mm phone plug or USB) and/or wirelessly (e.g., via Bluetooth, Wi-Fi, and/or the like).

Figure 2:
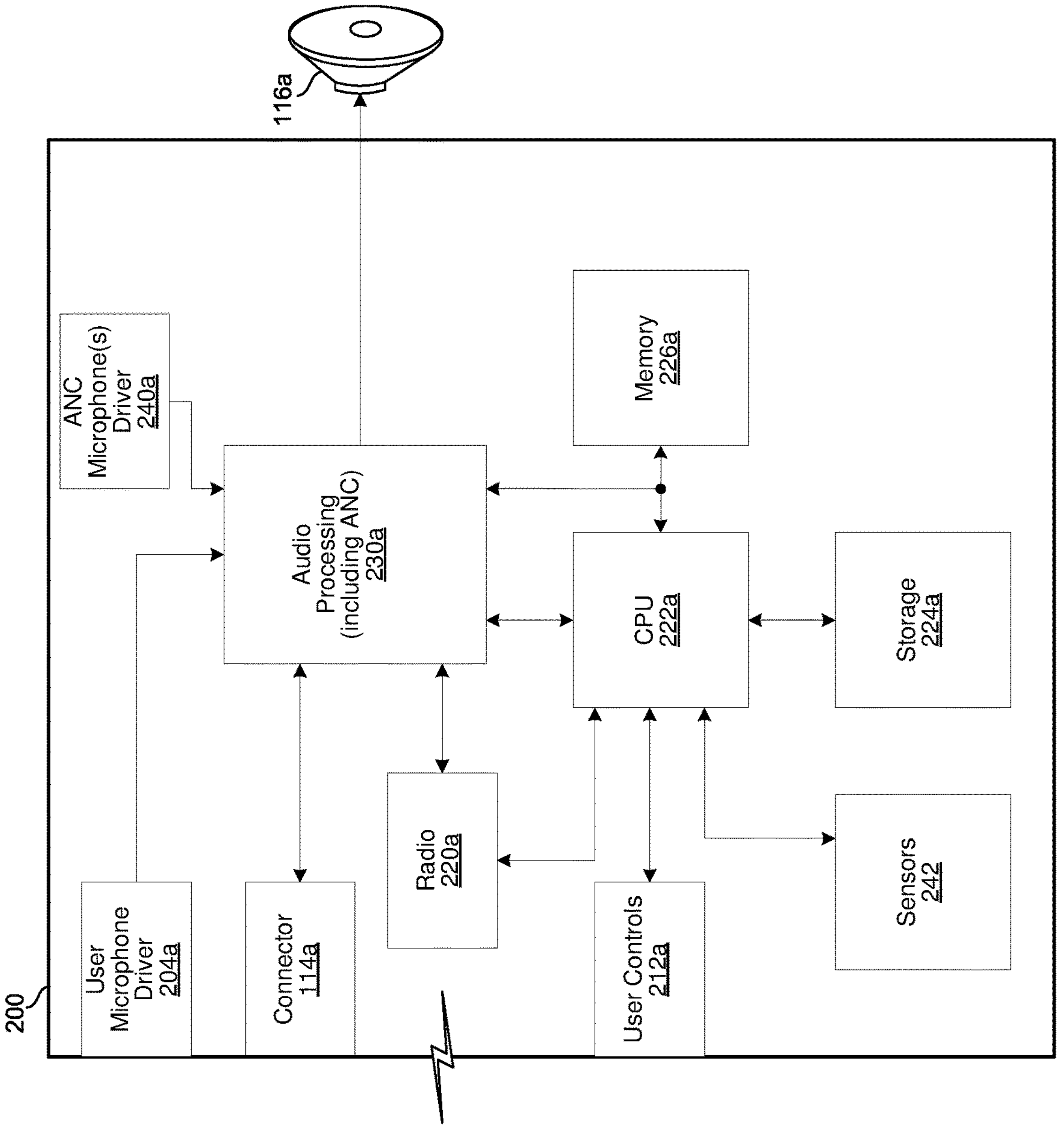
FIG. 2 depicts a block diagram of example circuitry operable to perform aspects of this disclosure.

FIG. 2 depicts a block diagram of example circuitry operable to perform aspects of this disclosure. Circuitry 200 operable to perform the functions described herein may reside entirely in the headset 100, or partially in the headset 100 and partially in the audio device 150. In the example implementation depicted, an instance of the circuitry 200 resides in each side of the headset 100 (only one side is shown for clarity of illustration).

In addition to the user controls 112, connectors 114*a*/114*b*, and speaker 116*a* already discussed, shown are a user microphone driver 204*a*, ANC microphone(s) driver 240*a*, radio 220*a*, a CPU 222*a*, a storage device 224*a*, a memory 226*a*, and an audio processing circuit 230*a*.

The radio 220*a* comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation of the same manufacturer as the headset 100).

The CPU 222*a* comprises circuitry operable to execute instructions for controlling/coordinating the overall operation of the headset 100. Such instructions may be part of an operating system or state machine of the headset 100 and/or part of one or more software applications running on the headset 100. In some implementations, the CPU 222*a* may be, for example, a programmable interrupt controller, a state machine, or the like.

The storage device 224*a* comprises, for example, FLASH or other nonvolatile memory for storing data which may be used by the CPU 222*a* and/or the audio processing circuitry 230*a*. Such data may include, for example, ANC configuration settings that affect ANC operations performed by the audio processing circuitry 230*a*.

The memory 226*a* comprises volatile memory used by the CPU 222*a* and/or audio processing circuit 230*a* as program memory, for storing runtime data, etc.

The audio processing circuit 230*a* comprises circuitry operable to perform audio processing functions such as volume/gain control, automatic noise cancellation, compression, decompression, encoding, decoding, introduction of audio effects (e.g., echo, phasing, virtual surround effect, etc.), and/or the like. The automatic noise cancellation may be configured via one or more user-configurable settings, such as those described below with reference to FIG. 3. The automatic noise cancellation may be performed purely in the analog domain, purely in the digital domain, and/or in a combination of the two.

The ANC microphone(s) driver 240*a* may comprise, for example, one or more audio-band amplifiers and/or filters. In an implementation in which automatic noise cancellation is performed digitally, the ANC microphone(s) driver 240*a* may comprise one or more analog-to-digital converters.

Figure 3:
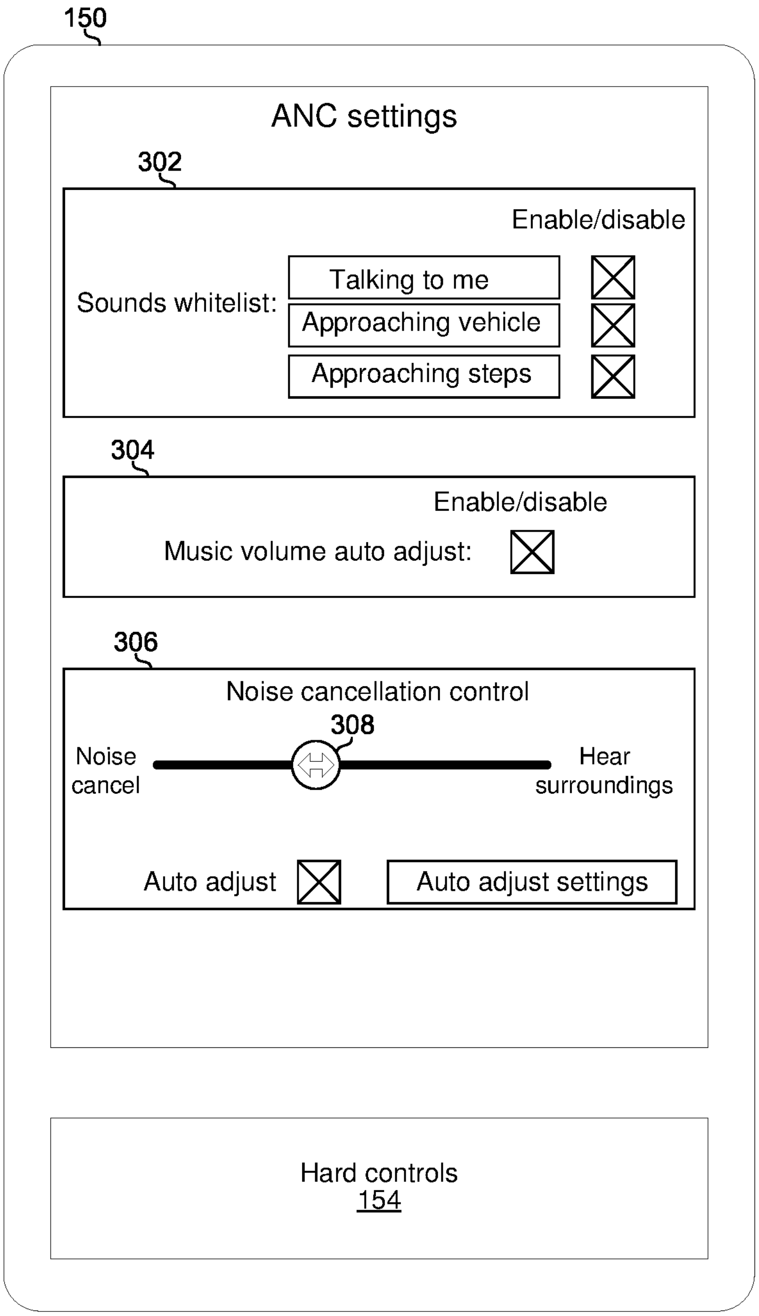
FIG. 3 depicts example controls for user configuration of automatic noise cancellation.

FIG. 3 depicts example controls for user/wearer configuration of automatic noise cancellation. FIG. 3 depicts an example implementation in which ANC settings are configurable via a graphical user interface presented on the audio device 150 to which the headset 100 is connected. In another implementation, the ANC settings may be controlled via the user controls 112 on the headset 100. In an example implementation, what is shown as computing device 150 may be integrated with the headset 100 (e.g., in the case of virtual reality headset with a near-to-eye display).

In the example implementation depicted, a first GUI element 302 enables configuring a sounds whitelist, that is, a list of sounds that the user does not want cancelled by ANC. Additionally, or alternatively, the GUI element 302 may enable configuring a sounds blacklist, that is, a list of sounds that the user does want cancelled by ANC. For each sound in the whitelist and/or blacklist, the headset 100 may store characteristics/signatures of such sounds that enable it to detect such sounds in the audio from the ANC microphones. As an example, a user may desire to whitelist the voice of a person that is talking to the user so that the user does not have to take off the headset and/or manually turn down the music volume in order to hear the speaker. As other examples, a user may (e.g., for safety reasons) desire to whitelist the sound of an approaching vehicle or the sound of approaching steps. An example process for how the whitelist/blacklist may be used is described below with reference to FIG. 5.

The characteristics/signatures may, for example, be provided by the producer(s) of the headset 110, the device 150, and/or software/firmware for the device 150 or headset 110. The producer(s) may record and analyze common sounds and upload characteristics/signatures of such sounds to a database which may then be transferred to the headset 100 and/or device 150 in the factory, during installation of ANC-related software/firmware, and/or made available for download via the Internet (e.g., on demand as requested by a user). Additionally, or alternatively, the characteristics/signatures may be captured by the user of the headset 100 and device 150. For example, when scrolling through the possible sounds to be included in the user's whitelist or blacklist, the user may not find a signature/characteristic that works well for a particular sound he or she wants to whitelist or blacklist. Accordingly, the GUI may provide an interface for triggering capture and analysis of a new sound to identify configuration of the ACN circuitry that works best for that user and that sound. The user may, for example, get close to the source of the sound (e.g., a buzzing appliance), trigger recording of the sound, and then the GUI may enable him to manually configure various ANC settings to try and find one that best cancels the sound and/or may simply cycle through a variety of settings asking the user to indicate whether each setting is better or worse than a previous setting until arriving at a setting that the user feels provides the best cancelling of the particular sound. The captured sound may then be named and stored to the device 150 and/or headset 100 for future selection as a whitelisted or blacklisted sound. The characteristics/signature and user's selected settings for cancelling it may also be uploaded to the Internet for download by other users.

In an example implementation, which sounds are whitelisted and/or blacklisted may automatically change based on a variety of factors such as, location of the device 150 and/or other devices in communication with the device 150 (via Bluetooth, Wi-Fi, or any suitable communication link). For example, a first set of whitelisted and/or blacklisted sounds (e.g., previously programmed by the user) may be automatically selected when the device 150 is connected to a car entertainment and navigation system via Bluetooth, and a second set of whitelisted and/or blacklisted sounds may be automatically selected when the device 150 is connected to the user's office Wi-Fi network. As another example, where headset 100 and computing device 150 make up a virtual reality headset, a first set of whitelisted and/or blacklisted sounds (e.g., previously programmed by the user) may be automatically selected when the display is showing live video of the wearer's surroundings and a second set of whitelisted and/or blacklisted sounds may be automatically selected when the display is showing virtual reality video.

In the example implementation depicted in FIG. 3, a second GUI element 304 enables the user/wearer to configure whether the volume of music (or game or other audio) being played through the headset should be automatically adjusted based on the audio picked up by the ANC microphones. For example, if volume auto adjust is enabled, the music volume may be increased as external noise increases and decreased as external noise decreases. This may be done in conjunction with, or instead of, ANC of the external noise. For example, element 304 may be configured to enable the user to configure automatic adjustment of volume based on the location of the headset 100, based on the activity of the wearer of the headset 100, and/or based on particular sounds being detected. The location may correspond to, for example, whether the wearer of the headset 100 is indoors, outdoors, on a busy street, in an elevator, in a plane, at home, at work, and/or the like. The location may be determined based on, for example, GPS coordinates (e.g., determined by radio 220*a* and/or a GPS receiver in device 150), which networks (e.g., Wi-Fi, cellular, etc.) are in range (e.g., determined by radio 220*a* and/or a radio in the device 150), inertial positioning using sensors 242 (and/or similar sensors in the device 150), manual selection by the user via the GUI, applications running on the device 150, and/or the like. The activity of the wearer may correspond to, for example, whether the wearer is running, biking, sleeping, working, and/or the like. The activity may be determined based on, for example, the determined location, outputs of the sensors 242 and/or similar sensors in the device 150, based on applications running on the device 150, and/or the like.

Automatic control of volume based on location may comprise, for example, automatically reducing volume when it is determined the wearer is in a place where he needs to hear his surroundings, such as on a busy street. Automatic control of volume based on sensor output may comprise, for example, automatically increasing volume when it is determined that the wearer is exercising. Automatic control based on detection of particular sounds may comprise, for example, automatically decreasing volume when the sound of an approaching car is detected, speech directed at the wearer of the headset 100 is detected, etc.

In the example implementation depicted in FIG. 3, a third GUI element 306 enables the user/wearer to adjust the amount of ANC being applied based on the audio picked up by the ANC microphones. The further to the left the user places the slider 308, the more of the external noise is cancelled, and the further to the right the user places the slider 308, the more external noise the user is able to hear. The user may slide it all the way to the left when, for example, on a plane and trying to sleep. The user may slide it all the way to the right, for example, when jogging on a busy street and wanting to keep aware of his/her surroundings for safety. The amount of ANC setting may work in conjunction with the whitelist/blacklist settings, may be used as an alternative to the whitelist/blacklist settings, may override the whitelist/blacklist settings, or be overridden by the whitelist/blacklist settings.

The element 306 may further enable the user to set whether the amount of ANC should be automatically adjusted and to configure settings for such automatic adjustments. For example, element 306 may be configured to enable the user to configure whether the amount of ANC is automatically adjusted based on the location of the headset 100, based on the activity of the wearer of the headset 100, and/or based on particular sounds being detected. The location may correspond to, for example, whether the wearer of the headset 100 is indoors, outdoors, on a busy street, in an elevator, in a plane, at home, at work, and/or the like. The location may be determined based on, for example, GPS coordinates (e.g., determined by radio 220*a* and/or a GPS receiver in device 150), which networks (e.g., Wi-Fi, cellular, etc.) are in range (e.g., determined by radio 220*a* and/or a radio in the device 150), inertial positioning using sensors 242 (and/or similar sensors in the device 150), manual selection by the user via the GUI, applications running on the device 150, and/or the like. The activity of the wearer may correspond to, for example, whether the wearer is running, biking, sleeping, working, and/or the like. The activity may be determined based on, for example, the determined location, outputs of the sensors 242 and/or similar sensors in the device 150, based on applications running on the device 150, and/or the like.

In an example implementation, the element 306 may be set to desired levels with user-programmable preset buttons. For example, a user may program a "jogging" button which, when pressed, moves the element 306 to a preset position toward the right end of the slider and a "plane" preset which, when pressed, moves the element 306 all the way to the left. As another example, where headset 100 and computing device 150 make up a virtual reality headset, the element 306 may automatically move to a first position when the display is showing live video of the wearer's surroundings, and move to a second position when the display is showing virtual reality video.

Automatic control of ANC based on location may comprise, for example, automatically reducing ANC when it is determined the wearer is in a place where he needs to hear his surroundings, such as on a busy street. Automatic control of ANC based on sensor output may comprise, for example, automatically increasing ANC when it is determined that the wearer is sleeping. Automatic control based on detection of particular sounds may comprise, for example, automatically decreasing ANC when the sound of an approaching car is detected, speech directed at the wearer of the headset 100 is detected, etc.

Although FIG. 3 uses a graphical user interface for illustration, the same controls of automatic noise cancellation could be achieved through voice commands, gestures, and/or any other human machine interface.

Figure 4:
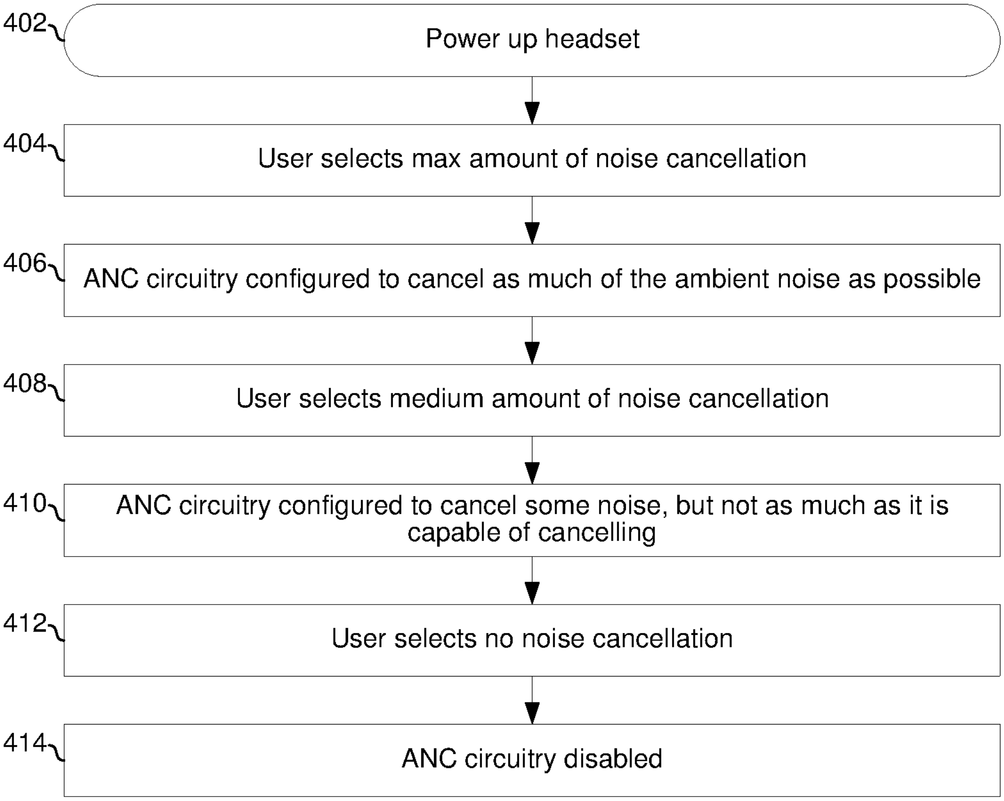
FIG. 4 is a flowchart illustrating a first example process for user configurable noise cancellation.

FIG. 4 is a flowchart illustrating a first example process for user configurable noise cancellation. In block 402, the headset 100 is powered up. In block 404, the user/wearer of the headset 100 adjusts the amount of ANC to a maximum amount (e.g., the user slides the slider 308 of element 306 all the way to the left). In block 406, in response to the user configuration of the amount of ANC, the audio processing circuitry 230*a* and/or ANC microphone driver 240*a* is configured (e.g., gains are set, filter coefficients are set, and/or the like) to provide the most aggressive noise cancellation that the headset 100 is capable of providing.

In block 408, the user adjusts the amount of ANC to an intermediate amount (e.g., the user slides the slider of element 306 to somewhere near the middle). In block 410, in response to the user configuration of the amount of ANC, the audio processing circuitry 230*a* and/or ANC microphone driver 240*a* is configured (e.g., gains are set, filter coefficients are set, and/or the like) to provide an intermediate amount of noise cancellation. This results in the user/wearer being able to hear more external noise than he/she was able to hear in block 406.

In block 412, the user adjusts the amount of ANC to disable ANC (e.g., slides the slider of element 306 all the way to the right). In block 414, in response to the user configuration of the amount of ANC, the audio processing circuitry 230*a* and/or ANC microphone driver 240*a* is configured (e.g., gains are set; filter coefficients are set; circuitry is disabled, switched out or powered down; particular software or firmware is retrieved from storage 224*a* and/or memory 226*a* and loaded into audio processing circuitry 230*a*, particular parameter values are retrieved from storage 224 and/or memory 226 and loaded into registers of the audio processing circuitry 230*a*, particular parameter values are into memory 226*a*, and/or the like) to disable cancellation of the noise based on the audio picked up by the ANC microphones. This results in the user/wearer being able to hear more external noise than he/she was able to hear in block 410.

Figure 5:
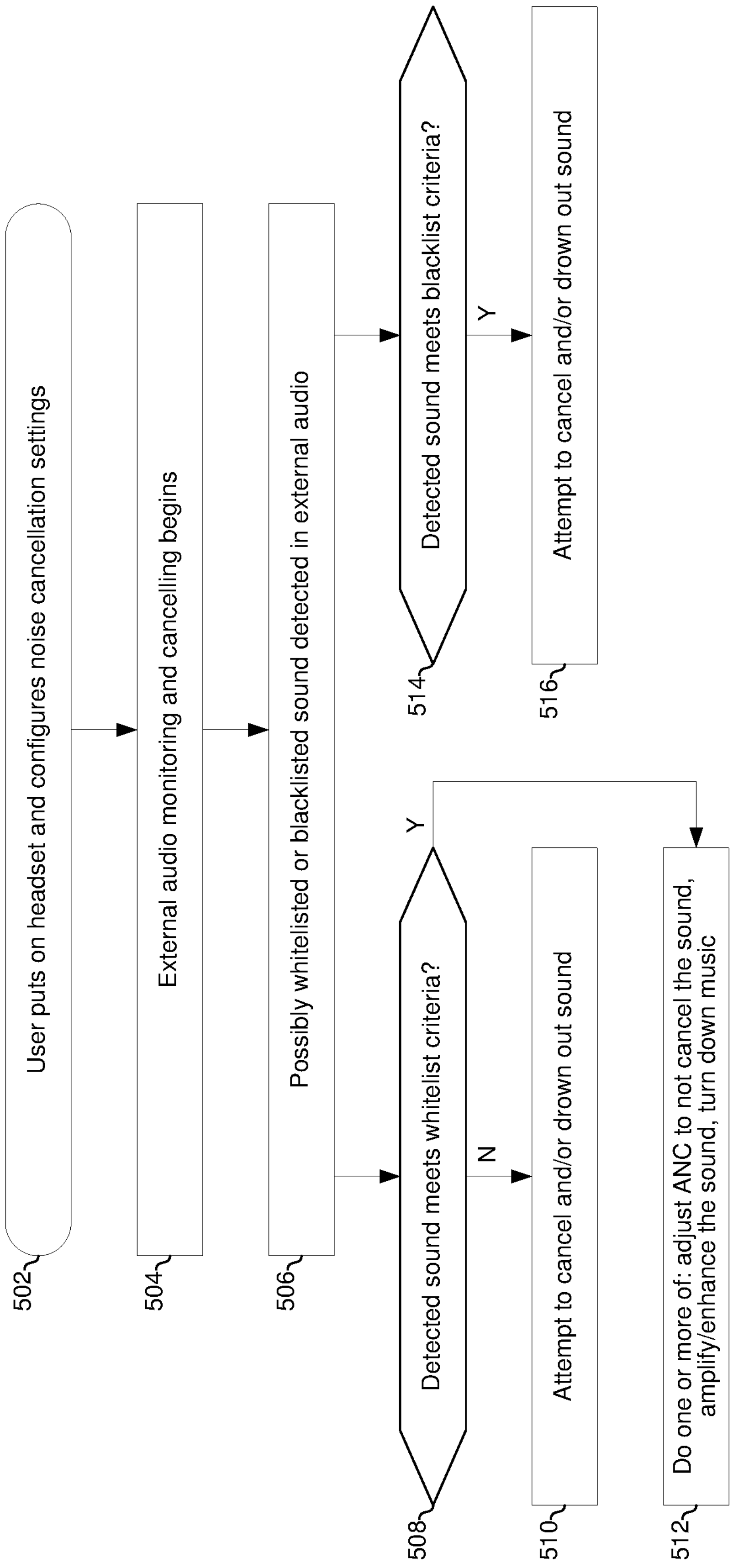
FIG. 5 is a flowchart illustrating a second example process for user configurable noise cancellation.

FIG. 5 is a flowchart illustrating a second example process for user configurable noise cancellation. In block 502, a user puts on the headset 100 and configures the noise cancellation settings to set one or more whitelisted and/or blacklisted sounds. In block 504, the headset begins by monitoring the external audio via ANC microphones and cancelling the external audio. In block 506, the headset 100 detects, in the audio from the ANC microphones, a sound that is possibly one of the user-configured whitelisted or blacklisted sounds. In block 508 the possible whitelisted or blacklisted sound is analyzed to determine whether it matches the criteria of one of the user-configured whitelisted or blacklisted sounds. If not, then in block 510 the headset 100 attempts to cancel the sound and/or drown out the sound by turning up the music volume (if the user has enabled automatic volume control). Returning to block 508, if the sound meets the criteria for deciding it is whitelisted, then in block 512 the headset may do any one or more of: reduce the amount of ANC so as not to cancel the sound, amplify and/or otherwise enhance (e.g., increase cancellation of other sounds) the whitelisted sound, and/or turn down the volume of the audio being played by the headset.

For example, if the voice of someone talking to the user is selected as a whitelisted sound, the analysis in block 508 may determine the directionality of voice (whether it is directed at the user of the headset 100) and the volume (e.g., whether the volume of the sound is increasing, as would typically happen when the person starts talking louder upon seeing that the user cannot hear because of the headset).

As another example, if the sound of an approaching vehicle is a whitelisted sound, the analysis in block 508 may determine whether the frequency content is consistent with the sound of vehicles, whether the frequency is increasing (due to Doppler), and whether the volume is increasing (as it would as the vehicle gets closer).

As another example, if the sound of approaching footsteps is a whitelisted sound, the analysis in block 508 may determine whether the frequency content are consistent with the sound of footsteps, and whether interval of the sounds is consistent with footsteps, and whether the volume is increasing (as it would as the footsteps get closer).

In parallel with blocks 508-510 are blocks 514 and 516. In block 514, the possible blacklisted sound is analyzed to determine whether it matches the criteria of one of the user-configured blacklisted sounds. If so, then in block 516 the headset 100 attempts to cancel the sound and/or drown out the sound by turning up the music volume (if the user has enabled automatic volume control).

In accordance with various example implementations of this disclosure, a system may comprise automatic noise cancellation circuitry (e.g., 230*a*) and interface circuitry (e.g., 212*a*, 204*a*, 222*a*, 112, and/or 154) operable provide an interface via which a user can configure which sounds said automatic noise cancelling circuitry attempts to cancel and which sounds said automatic noise cancelling circuitry does not attempt to cancel. The interface circuitry may be operable to provide an interface via which a user can select a sound to whitelist or blacklist. The interface circuitry may be operable to provide an interface via which a user can increase or decrease an amount of noise cancellation that is desired. The interface circuitry may be operable to provide an interface via which a user can select from among three or more levels of noise cancellation. The automatic noise cancellation circuitry may reside in a headset (e.g., 100) and the interface circuitry may reside in a computing device (e.g., 150) communicatively coupled to the headset via a wireless link. The automatic noise cancellation circuitry may comprise a microphone (e.g., 240*a*), and the interface circuitry may be operable to provide an interface via which a user can select whether to enable or disable automatic control of music volume based on audio captured by the microphone. The system may comprise audio processing circuitry (e.g., 220*a*, 230*a*, 204*a*, 222*a*, and/or 226*a*). The interface circuitry may be operable to provide an interface via which a user can trigger the audio processing circuitry to record a sound (e.g., to storage 224*a*), and switch among a plurality of settings of the automatic noise cancellation circuitry to determine a best one of the settings for automatic noise cancellation of the recorded sound. The system may comprise networking circuitry (e.g., 220*a*) operable to upload the recorded sound and the determined best one of the settings to a network. The system may comprise control circuitry (e.g., 230*a* and/or 222*a*) operable to automatically control an amount of automatic noise cancellation applied by the automatic noise cancellation circuitry based on detection of a particular sound (e.g., that was previously recorded or downloaded and selected by the user as a sound to be monitored for), by the automatic noise cancellation circuitry. The system may comprise control circuitry (e.g., 230*a*, 220*a*, 242, and/or 222*a*) operable to determine location of the user, and automatically control an amount of automatic noise cancellation applied by the automatic noise cancellation circuitry based on the determined location. The system may comprise control circuitry (e.g., 230*a* 242, and/or 222*a*) operable to determine an ongoing activity of the user, and automatically control an amount of automatic noise cancellation applied by the automatic noise cancellation circuitry based on the determined activity. The system may comprise audio processing circuitry (e.g., 230*a*) operable to automatically control a volume at which audio is presented to the user based on detection of particular sounds by the automatic noise cancellation circuitry. The system may comprise control circuitry (e.g., 222*a*, 242, and 220*a*) operable to determine location of the user, and audio processing circuitry (e.g., 230*a*) operable to automatically control a volume at which audio is presented to the user based on the determined location. The system may comprise control circuitry (e.g., 222*a*, 242, and 220*a*) operable to determine ongoing activity of the user, and audio processing circuitry (e.g., 230*a*) operable to automatically control an amount of automatic noise cancellation applied by the automatic noise cancellation circuitry based on the determined activity. The system may comprise a microphone (e.g., 240*a*) and a radio (e.g., 220*a*) operable to communicate audio over a wired or wireless connection, wherein audio captured by the microphone is provided to both the automatic noise cancellation circuitry and to the radio.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. That is, "x and/or y" means one or both of x and y. As another example, "x, y, and/or z" means any element of the seven-element set {(x), (y), (z), (x, y), (x, z), (y, z), (x, y, z)}. That is, "x, y and/or z" means one or more of x, y, and z. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A headset comprising:

automatic noise cancellation circuitry; and a microphone with controllable directionality, wherein:

the directionality of the microphone is determined according to whether a call is in progress, the microphone is configured as an automatic noise cancellation microphone only when the call is not in progress, the microphone is not configured as the automatic noise cancellation microphone when the microphone is used for the call in progress, the microphone is directed away from a user of the headset when the user is not speaking, and the microphone is directed toward the user of the headset when the user is speaking.

2. The headset of claim 1, wherein the automatic noise cancellation circuitry is operable to reduce a particular sound, and wherein the particular sound is selectable.

3. The headset of claim 1, wherein the automatic noise cancellation circuitry is operable to reduce some sounds while a particular sound remains unchanged, and wherein the particular sound that remains unchanged is selectable.

4. The headset of claim 1, wherein an amount of noise cancellation provided by the automatic noise cancellation circuitry is controllable.

5. The headset of claim 1, wherein an amount of noise cancellation provided by the automatic noise cancellation circuitry is selectable from among three or more levels of noise cancellation.

6. The headset of claim 1, wherein the headset is communicatively coupled via a wireless link to a computing device, and wherein the automatic noise cancellation circuitry is programmable via the computing device.

7. The headset of claim 1, wherein the automatic noise cancellation circuitry is programmable to control a music volume according to audio captured by the microphone.

8. The headset of claim 1, wherein the headset comprises audio processing circuitry, wherein the audio processing circuitry is operable to:

record a sound according to a trigger; and configure the automatic noise cancellation circuitry to reduce future sounds according to the recorded sound.

9. The headset of claim 1, wherein the headset comprises audio processing circuitry, wherein the audio processing circuitry is operable to:

record a sound according to a trigger; and communicate the recorded sound to another device.

10. The headset of claim 1, wherein the headset comprises control circuitry operable to select an amount of automatic noise cancellation applied by the automatic noise cancellation circuitry, and wherein the selection is according to a detection of a particular sound by the automatic noise cancellation circuitry.

11. The headset of claim 1, wherein the headset comprises control circuitry operable to:

determine a location of the user; and automatically control an amount of automatic noise cancellation applied by the automatic noise cancellation circuitry according to the determined location.

12. The headset of claim 1, wherein the headset comprises control circuitry operable to:

determine an ongoing activity of the user; and automatically control an amount of automatic noise cancellation applied by the automatic noise cancellation circuitry according to the determined activity.

13. The headset of claim 1, wherein the headset comprises audio processing circuitry operable to automatically control a volume at which audio is presented to the user according to a detection of a particular sound by the automatic noise cancellation circuitry.

14. The headset of claim 1, comprising:

control circuitry operable to determine location of the user; and audio processing circuitry operable to automatically control a volume at which audio is presented to the user according to the determined location.

15. The headset of claim 1, comprising:

control circuitry operable to determine an ongoing activity of the user; and audio processing circuitry operable to automatically control an amount of automatic noise cancellation applied by the automatic noise cancellation circuitry according to the determined activity.

16. The headset of claim 1, wherein the automatic noise cancellation circuitry is operable to receive audio from an external microphone that is wirelessly coupled to the headset.

17. The headset of claim 1, wherein:

the automatic noise cancellation circuitry is configurable to automatically select an amount of automatic noise cancellation according to whether a user is located outdoors or indoors.

* * * * *